(12) United States Patent  
Govani et al.

(10) Patent No.: US 8,909,652 B2
(45) Date of Patent: Dec. 9, 2014

(54) DETERMINING ENTITY POPULARITY USING SEARCH QUERIES

(71) Applicant: Microsoft Corporation, Redmond, WA (US)

(72) Inventors: Tabreez Govani, Bellevue, WA (US); Hugh Williams, Redmond, WA (US); Jamie Buckley, Redmond, WA (US); Nitin Agrawal, Redmond, WA (US); Andy Lam, Seattle, WA (US); Kenneth A. Moss, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 90 days.

(21) Appl. No.: 13/804,830

(22) Filed: Mar. 14, 2013

(65) Prior Publication Data

US 2013/0268482 A1 Oct. 10, 2013

Related U.S. Application Data

(62) Division of application No. 12/013,275, filed on Jan. 11, 2008, now Pat. No. 8,402,031.

(51) Int. Cl.
*G06F 17/30* (2006.01)

(52) U.S. Cl.
CPC ...... *G06F 17/3053* (2013.01); *G06F 17/30864* (2013.01)
USPC ............ 707/748; 707/723; 707/727; 707/751

(58) Field of Classification Search
USPC ................................. 707/748, 723, 727, 751
See application file for complete search history.

(56) References Cited

U.S. PATENT DOCUMENTS

| 7,428,522 | B1 * | 9/2008 | Raghunathan | 1/1 |
| 7,613,690 | B2 * | 11/2009 | Chowdhury et al. | 1/1 |
| 2007/0233656 | A1 * | 10/2007 | Bunescu et al. | 707/3 |
| 2008/0255935 | A1 * | 10/2008 | Madhavan et al. | 705/14 |
| 2009/0006311 | A1 * | 1/2009 | Ting et al. | 707/2 |
| 2009/0157651 | A1 * | 6/2009 | Tomkins et al. | 707/5 |

* cited by examiner

*Primary Examiner* — Mahesh Dwivedi
(74) *Attorney, Agent, or Firm* — Dave Ream; Doug Barker; Micky Minhas

(57) ABSTRACT

Systems, methods, and computer-readable media for determining the Internet search popularity of an entity are provided. Embodiments of the present invention include receiving a group of Internet search records and assigning a popularity ranking based on the number of times an entity descriptor associated with an entity occurs within the group of Internet search records created over a designated time period. An entity descriptor is one or more terms commonly used to identify an entity. The trend in an entity's popularity rank may also be calculated. An entity's popularity rank and trend in popularity rank may be presented in a graph or in a list.

13 Claims, 4 Drawing Sheets

DETERMINING ENTITY POPULARITY USING SEARCH QUERIES

CROSS-REFERENCE TO RELATED APPLICATIONS

This application is a divisional of U.S. patent application Ser. No. 12/013,275, filed Jan. 11, 2008, titled DETERMINING ENTITY POPULARITY USING SEARCH QUERIES, which is herein incorporated by reference.

BACKGROUND

Internet users enter search terms into Internet-based search engines to find information about various entities (e.g., people, sports teams, cities, and companies). The search terms entered over a time period may be evaluated to determine the most frequently searched for entities.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to determining an entity's Internet search query popularity and the change in popularity over time. An entity's Internet search query popularity is determined by the number of times an entity descriptor associated with the entity is present within the search terms associated with an individual Internet search record. An entity descriptor is any word or phrase that is commonly used to describe the entity. Entities may be ranked in order of popularity. Entities may also be ranked according to a movement score that reflects an entities relative change in rank over a designated time period. The movement score for each entity may be calculated by determining the change in the entity's rank over time. The entities may be displayed according to their popularity rank and/or their movement score in a list, or in graph form. In some embodiments, the list and graph are presented on a website for users to view.

BRIEF DESCRIPTION OF THE DRAWINGS

The present invention is described in detail below with reference to the attached drawing figures, wherein.

DETAILED DESCRIPTION

Figure 1:
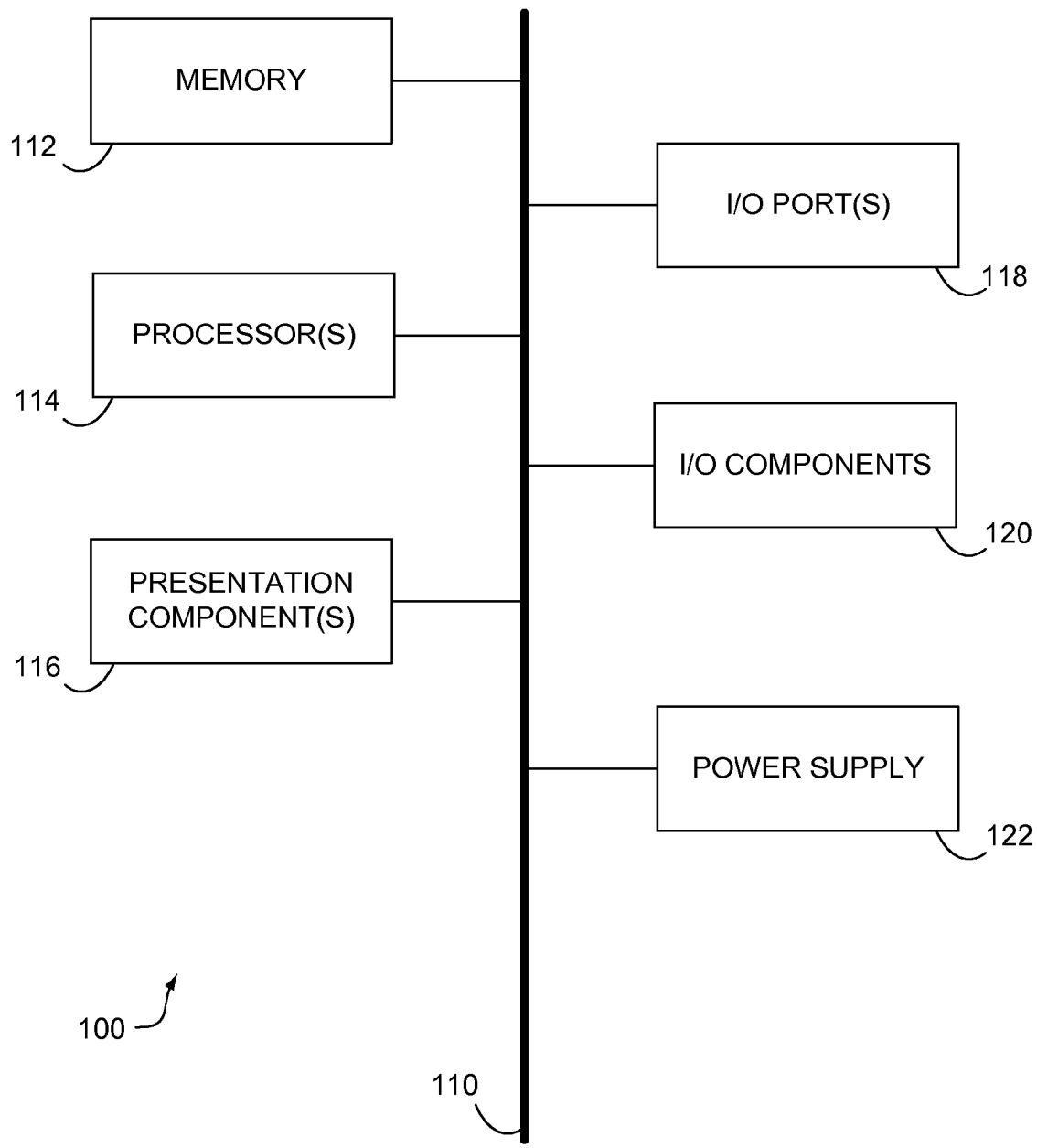
FIG. 1 is a block diagram of an exemplary computing environment for determining the search query popularity of an entity.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Accordingly, in one embodiment, the present invention relates to computer storage media having computer-executable instructions embodied thereon for performing a method of automatically determining search popularities for one or more entities. The method includes receiving a plurality of Internet search records each including one or more search terms associated therewith and receiving information regarding a plurality of entities. The method also includes determining a search score for at least one entity within the plurality of entities, wherein the search score for the at least one entity increases each instance an individual Internet search record contains an entity descriptor associated with the at least one entity. An entity descriptor is one or more terms commonly used to identify the at least one entity. An individual Internet search record contains the entity descriptor if the entity descriptor is identified within the one or more search terms associated with the individual Internet search record. The method further includes determining a popularity rank for the at least one entity by ranking the at least one entity according to the search score associated with the at least one entity relative to a respective search score for each other entity within the plurality of entities and determining a movement score for the at least one entity that is based on a change in popularity rank for the at least one entity over a predefined time period. In one embodiment, the movement score is calculated using a first method if a present popularity rank for the at least one entity is above a threshold popularity rank and a second method if the present popularity rank for the at least one entity is below the threshold popularity rank. The second method results in a lower movement score relative to the first method given the same raw popularity rank change for the at least one entity. The method also includes storing the movement score associated with the at least one entity in a data store.

In another embodiment, the present invention relates to a computerized method for automatically determining Internet search popularity of one or more entities. The method includes receiving a plurality of Internet search records submitted over a first time period each including at least one or more search terms. The method also includes creating a group of spam-filtered Internet search records that includes a plurality of Internet search records submitted over the first time period minus Internet search records determined to be spam and receiving an entity list including a plurality of entities. The method further includes receiving one or more entity descriptors associated with each individual entity within of the plurality of entities. An entity descriptor is one or more terms commonly used to identify a particular individual entity. The method further includes determining a plurality of search scores for at least one entity within the plurality of entities, wherein a search score increases each instance an individual Internet search record contains an entity descriptor associated with the at least one entity. The individual Internet search record contains the entity descriptor if the entity descriptor is identified within the one or more search terms associated with the individual Internet search record. The method further includes determining a popularity rank for the at least one entity by ranking the at least one entity according to the plurality of search scores associated with the at least one entity multiplied by a plurality of historical discount factors relative to a respective plurality of search scores for each other entity within the plurality of entities multiplied by the plurality of historical discount factors, wherein the plurality of search scores are determined over a plurality of sub-time periods within the first time period, and wherein the plurality of historical discount factors are sub-time-period-specific, thereby giving more weight to chronologically recent Internet search records. The method further includes assigning a movement score to each of the plurality of entities based on a change in popularity ranking for each of the plurality of entities over a predefined time period. The method also includes storing the popularity rank associated with each of the plurality of entities in a data store.

In yet another embodiment, the present invention relates to a computerized system for identifying trends within queries. The system includes a query log component for receiving data from one or more query logs, wherein a query log stores Internet search records each including one or more search terms. The system also includes a bot filter component for creating a filtered query log comprising Internet search records with one or more spam Internet search records removed therefrom. A spam Internet search record is any Internet search record not created as a result of a search requested by an individual user. The system further includes an entity rank component for creating a popularity rank log that contains a popularity rank for a plurality of entities. The popularity rank for a ranked entity is based on a number of times one or more entity descriptors associated with the ranked entity are present within the Internet search records and multiplied by a correction factor for the ranked entity. An entity descriptor is one or more terms commonly used to identify an individual entity. A disambiguation component for generating the correction factor for the ranked entities that corrects for any false positive Internet search records containing one or more entity descriptors associated with the ranked entity but where the ranked entity is not an intended object of an Internet search associated with the false positive Internet search records. A trend analysis component for creating a trend log that contains a movement score for at least one of the plurality of entities, wherein the movement score for the at least one of the plurality of entities is based on a change in popularity ranking over a predefined time period, the movement score being calculated with a method that discounts the change in popularity rank for a first entity with a first popularity rank below a predefined threshold relative to a second entity with a second popularity rank above the predefined threshold. The system further includes a data store for storing the movement score for the one or more entities.

Having briefly described an overview of embodiments of the present invention, an exemplary operating environment suitable for use in implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-usable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
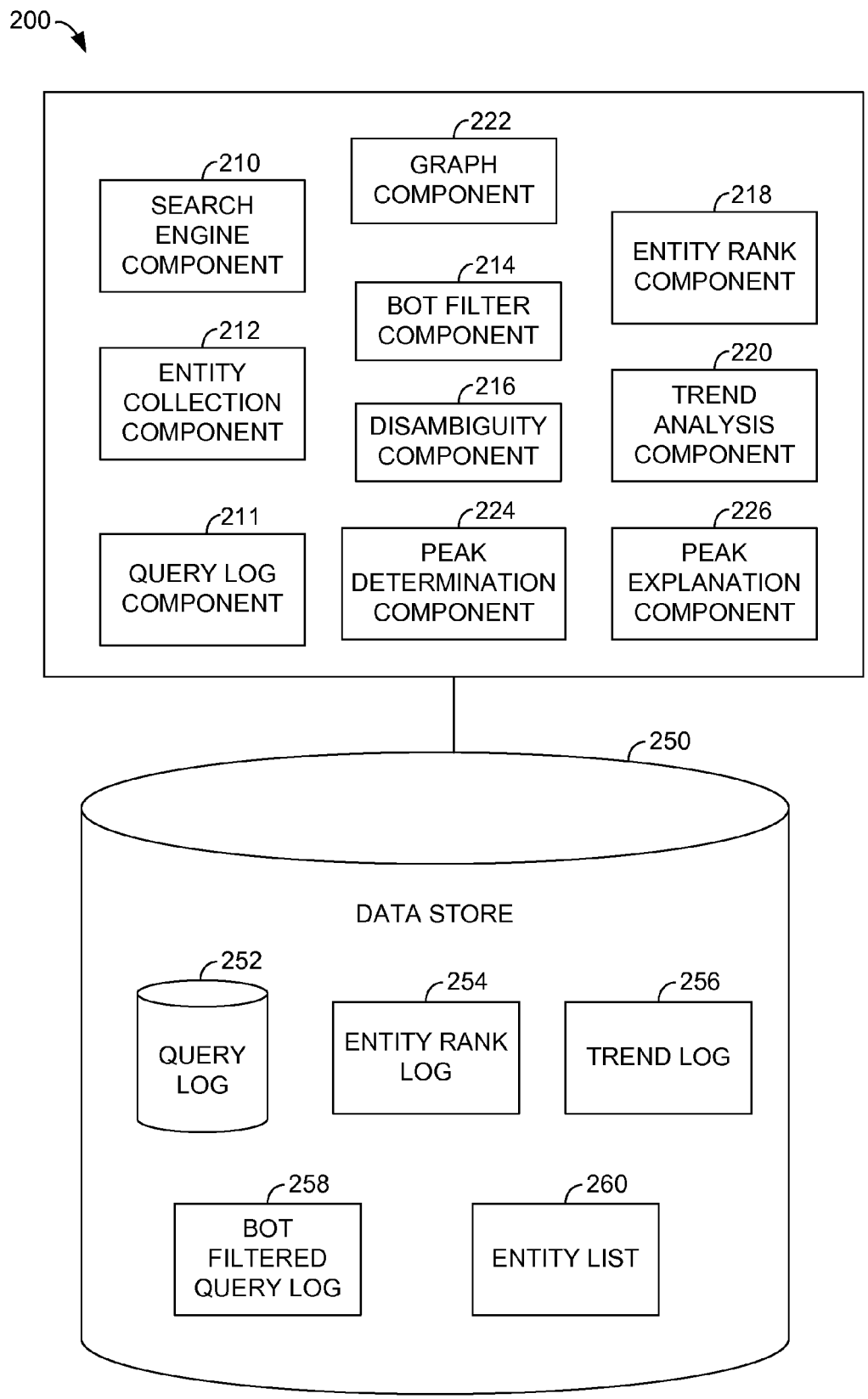
FIG. 2 is a block diagram of an exemplary computing system architecture suitable for use in implementing embodiments of the present invention.

Turning now to FIG. 2, a block diagram is illustrated that shows an exemplary computing system architecture 200 suitable for determining the popularity of an entity based the number of times the entity is the object of an Internet search query that is submitted to an Internet search engine, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of the use or functionality of the present invention. Neither should the computing system architecture 200 be interpreted as having any dependency or requirement related to any single component/module or combination of component/modules illustrated therein.

Computing system architecture 200 includes a search engine component 210, an entity collection component 212, a bot filter component 214, an entity rank component 216, a disambiguation component 218, a trend analysis component 220, a graph component 222, a peak determination component 224, a peak explanation component 226, query log component 228, and data store 250. Data store 250 includes several sets of data including query log 252, entity rank log 254, trend log 256, bot filtered query log 258, and entity list 260. Computing system architecture 200 may be a single computing device, such as computing device 100 shown in FIG. 1. In the alternative, computing system architecture 200 may be a distributed computing environment that includes multiple computing devices coupled with one another via one or more networks. Such networks may include, without limitation, one or more local area networks (LANs) and/or one or more wide area networks (WANs). Such network environments are commonplace in offices, enterprise/wide computer networks, intranets, and the Internet. Accordingly, the network, or combination of networks, is not further described herein.

A search engine component 210 is configured for presenting Internet search results in response to a user's query that may be submitted through a website. In one embodiment, the search engine contains one or more web crawlers that search the Internet and build a table containing web addresses along with the subject matter of those web pages. The search engine may be accessed by Internet users through a website. An Internet user may conduct an Internet search by submitting one or more search terms through a user interface presented on the website that is associated with a search engine. The Internet search engine may then present one or more websites that match the user's search terms. The search engine component 210 may generate a query log 252 that is stored in data store 250. The query log 252 may store data regarding each Internet search submitted to the search engine component 210. Examples of data collected in the query log 252 include the one or more search terms submitted for each Internet search, the search results presented, the search results selected by the user, an IP address for the user, and user browser information including the user agent field.

The query log component 211 is configured for receiving one or more query logs 252 and/or query information. The query log 252 may be generated by search engine component 210. The query information may be received from search engine component 210 or any other source of query information.

The entity collection component 212 is configured for collecting one or more entities that may be the intended object of a user's Internet search. An entity could be a person, a corporation, a government unit, a product, a sports team, a geographic location, etc. In one embodiment, the entity collection component 212 searches for reoccurring search terms within query log 252 and determines if the reoccurring search term is an appropriate entity to track. This determination may be made without human intervention, or confirmed by a person reviewing the selected entity. In another embodiment, a person submits entities to the entity collection component 212. Once the entity collection component 212 has identified one or more entities, an entity list 260 that contains a plurality of entities is created and stored in data store 250.

The bot filter component 214 is configured for distinguishing between legitimate Internet searches submitted by individual users and spam Internet searches submitted by a computer application with any purpose other than finding a relevant website (e.g., increasing traffic to a website, increasing the sites importance within the search engine rankings, increasing the popularity score of an entity). The spam results may be generated by a computer application running without any user input. In one embodiment, the Internet search record is determined to be spam if an entry in a user agent field associated with the individual Internet search record is less than 20 characters in length. The user agent field is one of the fields that may be stored in the one or more query logs 252. Other methods may be used to determine an Internet search record is spam.

In one embodiment, the bot filter component 214 creates a bot filtered query log 258. The bot filtered query log 258 contains all of the Internet searches and associated Internet search terms from the query log 252, minus spam Internet searches and their associated search terms, which are removed. The query log 252 may be a table with each line of the table containing data from a single Internet search. Each column in the table may contain different information related to the search including the search terms, user IP address, and results returned as part of the search. The bot filter component 214 may create the bot filtered query log 258 by copying the query log 252 and identifying and deleting the lines containing spam Internet searches. The bot filtered query log may also serve the purpose of establishing the time frame over which subsequent calculations are preformed. For example, the bot filtered query log 258 may only contain Internet searches for the last week, whereas the query log 252 may contain Internet search data for several years. The bot filtered query log 258 may be stored as a read only file. As explained subsequently, a new bot filtered query log 258 may be created every time a new trend analysis or entity rank calculation is performed. In the alternative, the bot filtered query log 258 may be continuously updated.

The entity rank component 216 calculates a popularity rank for each entity within entity list 260. In general, the entity rank is based on the number of times the entity is the object of an Internet search as compared with the number of times each of the other entities in entity list 260 is the object of an Internet search. For example, if a first entity is the object of 20 Internet searches it will be ranked higher than a second entity that is the object of 10 Internet searches. In one embodiment, the entity is the object of an Internet search if an entity descriptor that is associated with the entity occurs within the search terms submitted as part of an Internet search. An entity descriptor is a word or phrase commonly used to identify the entity. An entity may have several entity descriptors. For example, entity descriptors for Jennifer Lopez could include "Jennifer Lopez," "Jlo," or a common misspelling such as "Jennifer Lopezz." However, in some instances the entity is not the intended object of an Internet search even though an associated entity descriptor occurs within the search terms. For example, an entity descriptor "sting" for the artist Sting could occur in search terms where the object of the search is information regarding a bee sting. For this reason, a correction factor is needed to accurately determine the number of times the entity is the actual object of the Internet search.

The disambiguation component 218 is configured for generating a correction factor for each entity. The correction factor accounts for searches containing entity descriptors associated with the entity but where the entity is not the intended object of the Internet search. The correction factor is used to adjust the total number of Internet searches that contain an entity descriptor associated with the entity so that only Internet searches where the entity is the intended object are reflected in the entity popularity rank. In the example given above where some Internet search records containing the entity descriptor "sting" will refer to the artist, while others will seek information on a bee sting, the disambiguation component 218 determines the ratio of Internet searches where the user intends the entity descriptor to refer to the artist versus the bee sting. This may be accomplished using a number of methods including evaluating the subject matter category of the search result ultimately selected by the user. If the subject matter category of the search result selected by the user is entertainment, it will be determined that Sting the artist is the intended object of the search. In contrast, if the subject matter of the search result selected by the user is health then it will be determined that the intended object of the search was not the artist Sting. Search results generally associated with entertainment would indicate the artist was intended whereas search results referring to medical advice or education would indicate that a bee sting was intended. If the disambiguation component 218 determined that 80 out of 100 occurrences of the entity descriptor "sting" intended to search for the artist Sting, then the correction factor for the artist Sting would be 0.8.

The entity rank component 216 and the disambiguation component 218 work together to accurately determine the number of times an entity is the intended object of an Internet search. In one embodiment, an entity rank is calculated by multiplying the correction factor for the entity by the total number of times an entity descriptor associated with an entity occurs within the search terms submitted over a predetermined time period. The entity with the highest number of adjusted occurrences would be ranked first and the entity with the least number of adjusted occurrences would be ranked last. The entity rank component 216 may output these calculations into an entity rank log 254 that may be stored within data store 250. The entity rank log 254 may be a read-only file. Further the entity rank log 254 may be associated with the time at which the rank was calculated. In one embodiment, a new entity rank log 254 is generated several times per day. In one embodiment, the entity rank log 254 is updated in real time.

In one embodiment, the entity rank component 216 separates the Internet records into discrete groups and analyzes them in parallel using multiple processors. The total number of times an entity descriptor associated with an individual entity occurs within the Internet records is determined by aggregating the results from each processor. In one embodiment, more than 100 processors and discrete groups are utilized.

The trend analysis component 220 is configured for determining a movement score for an entity based on the change in the entities popularity rank over time. For example, the trend analysis component 220 may calculate the rank movement over two days, three days, seven days, two weeks, etc. In one embodiment, a first method is used to calculate the movement score if the present popularity rank for the entity is above a predetermined threshold and a second method of calculating the movement score is used if the present rank of the entity is below the predetermined threshold rank. For example, if the present rank of an entity is above the predetermined threshold rank of 500 (ranked 1 to 499), then a movement score may be calculated by taking $\log_2$ of yesterday's rank minus $\log_2$ of the present rank. On the other hand, if the present rank of the entity is below 500 (500+), then the movement score is calculated by taking $\log_{10}$ of yesterday's rank minus $\log_{10}$ of the present rank. Using this, or a similar formula, decreases the movement scores for low-ranked entities. In this example, low ranked entities have few adjusted occurrences within the search results and the highest ranked entity (ranked first) has the highest number of adjusted occurrences within the search results. Using two different calculation methods results in more relevant results than using the raw popularity rank change because the rank of a low-ranked entity may change significantly with even a small increase in the number of times an associated entity descriptor occurs within the search results (adjusted occurrences). For example, it may be desirable to highlight a trend of an entity from 50 to 5 (with a raw popularity rank change of 45) and discount the change in an entity's rank from 6,000 to 3,000 (with a raw popularity rank change of 3,000). The movement calculation may be stored within a trend log 256 that is kept within data store 250. Multiple trend logs may be created and associated with the time at which the trends were determined. In one embodiment, the trend log 256 is updated in real time.

Graph component 222 is configured to generate graphs that present data about an entity in graphical form. In one example, a graph indicating the change in popularity rank over time is presented. Any time frame may be chosen and the rank scale may be adjusted to highlight changes within the rank. For example, if the rank of an entity fluctuates between 2,000 and 3,000, the rank scale may be between 1,500 and 3,500 to accentuate the changes in the entity's rank. On the other hand, if the rank change is from 100 to 40 the rank scale may be presented from 200 to 1. Similarly, any time frame for the graph may be chosen. In one embodiment, the time frame selected contains several significant changes in rank.

The peak determination component 224 is configured for identifying one or more peaks within the trend graph. A peak occurs when the entity's rank increases and then stays the same, decreases, or is unknown on the trend graph. Peaks may be determined by identifying the highest ranked peak, the second highest ranked peak, the third highest ranked peak, and so forth. In one embodiment, the determined peaks may be restricted so that they are separated by a predetermined amount of time. When multiple peaks occur on a graph, more recent peaks or a current upward trend within the last day or two may be favored. An indication may be added to the trend graph to highlight the peaks selected by peak determination component 224.

The peak explanation component 226 is configured to determine the reason for the increased rank of the entity for each of the peaks chosen by peak determination component 224. The explanation for the peak may be determined by evaluating the Internet searches containing the entity descriptors associated with the graphed entity contemporaneous with the peak. For example, if the search term "Mr. and Mrs. Smith" appears more frequently in Internet searches also containing Internet descriptors for entity Brad Pitt, the peak explanation component 226 may determine that the explanation for the peak is "Mr. and Mrs. Smith." In another embodiment, the peak explanation component 226 evaluates news articles that are chronologically contemporaneous with the peak and contain entity descriptors for the entity that is the subject of the graph.

Figure 3:
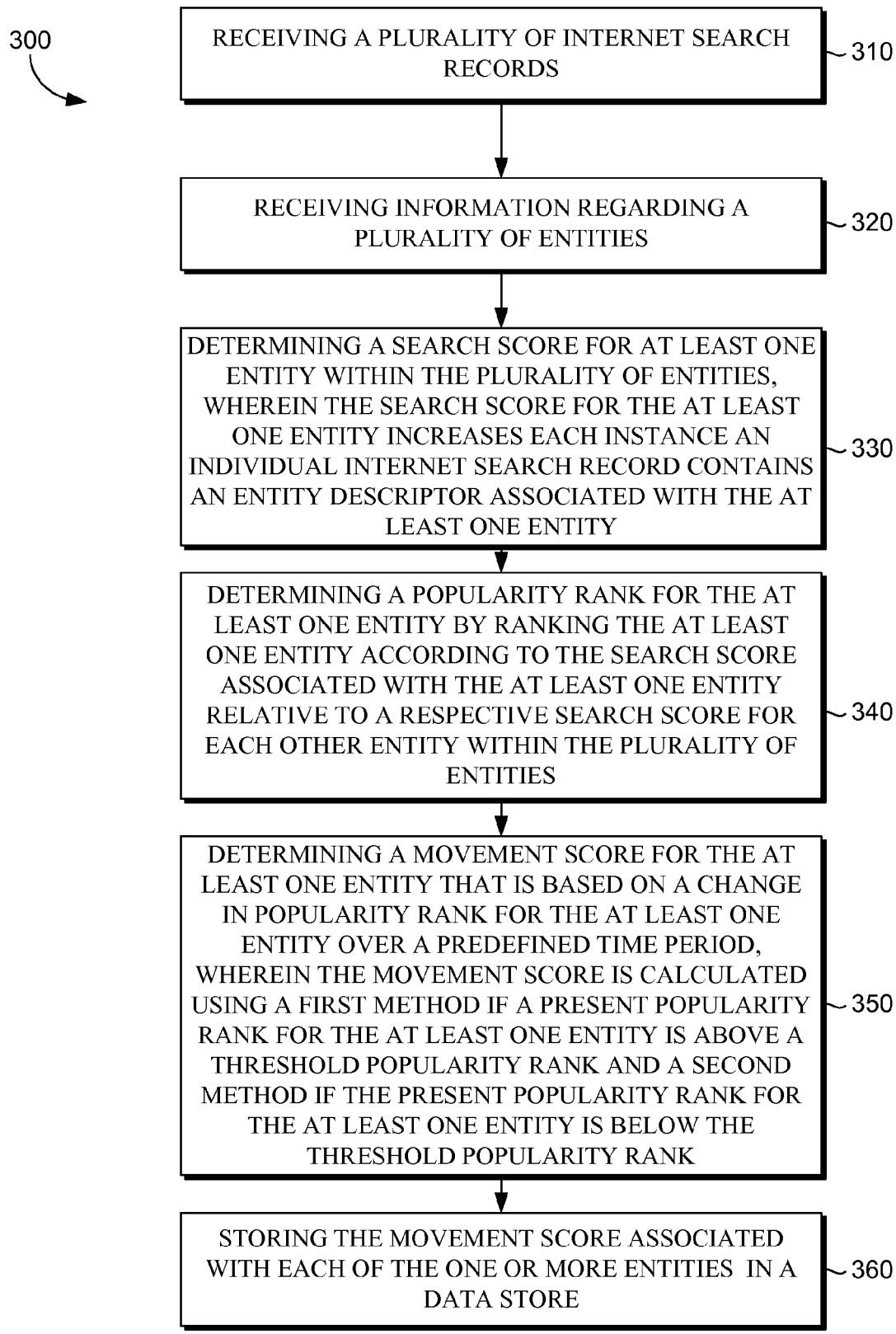
FIG. 3 is a flow diagram illustrating an exemplary method for selecting an advertisement to be associated with a visual media object, in accordance with an embodiment of the present invention.

Referring next to FIG. 3, a flow diagram showing an exemplary method for automatically determining search popularities for one or more entities is shown and designated generally as reference numeral 300. In one embodiment, automatically means without user intervention. At Step 310, a plurality of Internet search records is received. Each Internet search record within the plurality of Internet search records includes at least one or more search terms. As explained previously, other information regarding the Internet search associated with the Internet search record may be captured and stored within an Internet search record (e.g., a user IP address on search results returned in response to the one or more search terms). In one embodiment, the Internet search records are generated in association with an Internet search engine. In this case, a user may enter one or more search terms into a user interface present on a web page. The search engine returns relevant search results based on the one or more search terms submitted by the user.

At step 320, information regarding a plurality of entities is received. An entity may be a person, a corporation, a product, a movie, or other objects of an Internet search. Examples of people that may be included as entities are celebrities, sports figures, politicians, and other public figures. The plurality of entities may be generated by a person creating a list, or automatically by a process that identifies entities that are common objects of Internet searches.

At step 330, a search score for at least one entity within the plurality of entities is determined. The search score for an entity increases each instance an individual Internet search record contains an entity descriptor associated with the individual entity. As described previously, an entity descriptor is one or more terms commonly used to identify the individual entity. In one embodiment, the number of times an entity descriptor is present within the plurality of Internet search records is reduced by multiplying the raw number by a correction factor. The correction factor is meant to account for the Internet search records containing an entity descriptor associated with the entity but where the entity is not the intended object of the search. The search score may be stored in a file that contains the search score of each entity and the time when the search score was calculated.

At step 340, a popularity rank for the at least one entity is determined based on comparing the search score for the at least one entity with the search score of other entities within the plurality of entities. Thus, every entity within the entity list may receive a rank. The entities with the highest search score would receive the highest rank, and the entities with the lowest score receive the lowest rank. In one embodiment, the popularity rank is stored in a table that contains the popularity rank of each entity associated with the time in which the popularity rank was calculated.

At step 350, a movement score for at least one entity is determined by calculating a change in the popularity rank associated with the individual entities within the plurality of entities over a predetermined time period. As explained previously, different methods may be used to calculate the movement score of entities with a higher or lower present popularity rank.

At step 360, the movement score associated with each of the one or more entities is stored in a data store. The movement score may be stored in a file that associates each entity with a movement score calculated at a particular time. In one embodiment, the entities are displayed on a web page according to their movement score or their popularity rank. The entities may be displayed in a list or in a graph.

Figure 4:
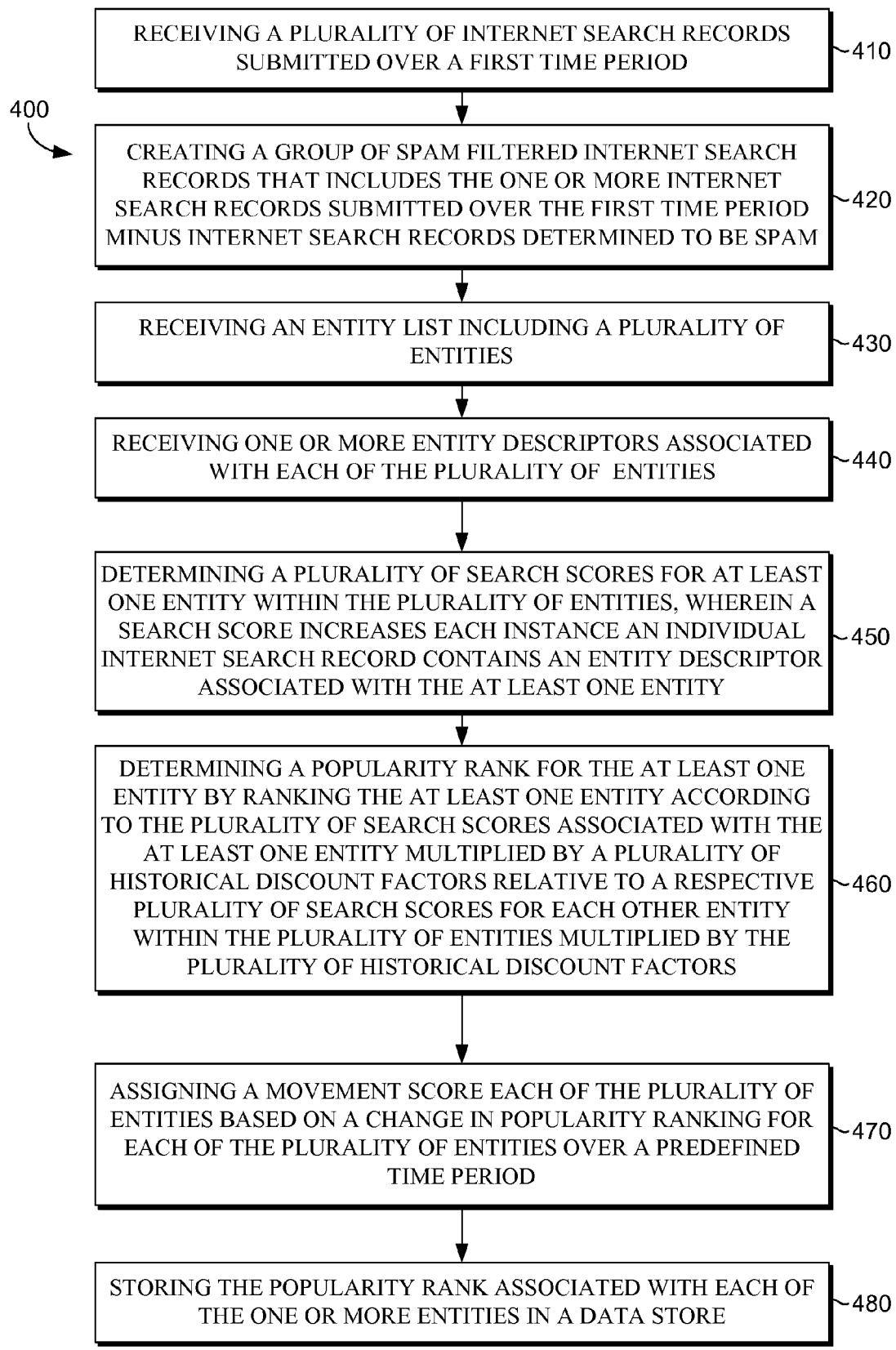
FIG. 4 is flow diagram illustrating an exemplary method for determining the Internet search popularity of one or more entities without user intervention, in accordance with an embodiment of the present invention.

Referring next to FIG. 4, a flow diagram showing an exemplary method for automatically determining the Internet search popularity of one or more entities is illustrated and designated generally as reference numeral 400. In one embodiment, automatically means without user intervention. At step 410, Internet search records submitted over a first time period are received. Each Internet search record includes at least one or more search terms. Other data that may be included within each Internet search record was described previously.

At step 420, a group of spam-filtered Internet search records are created that include the Internet search records submitted over the first time period minus Internet search records determined to be spam. In one embodiment, the Internet search record is determined to be spam if an entry in a user agent field associated with the individual Internet search record is less than 20 characters in length. Other methods may be used to determine an Internet search record is spam.

At step 430, an entity list including a plurality of entities is received. The creation of an entity list has been described previously. At step 440, one or more entity descriptors associated with each of the plurality of entities is received. An entity descriptor is one or more terms commonly used to identify an entity. In one embodiment, the entity descriptors are stored in the entity list. The entity descriptors may be input by a person or determined through an automated process. For example, entity descriptors based on common misspellings could be generated automatically for an entity.

At step 450, a plurality of search scores for at least one entity within the plurality of entities is determined. The search score for an entity increases each instance an individual Internet search record contains an entity descriptor associated with the individual entity. As described previously, an entity descriptor is one or more terms commonly used to identify the individual entity. In one embodiment, the number of times an entity descriptor is present within the plurality of Internet search records is reduced by multiplying the raw number by a correction factor. The correction factor is meant to account for the Internet search records containing an entity descriptor associated with the entity but where the entity is not the intended object of the search. The search score may be stored in a file that contains the search score of each entity and the time when the search score was calculated.

At step 460, a popularity rank for at least one entity is determined by ranking the at least one entity according to the plurality of search scores associated with the at least one entity multiplied by a plurality of historical discount factors relative to a respective plurality of search scores for each other entity within the plurality of entities multiplied by the plurality of historical discount factors. The plurality of search scores may be determined over a plurality of sub-time periods within the first time period. Further, the historical time periods may be sub-time period specific. The purpose of multiplying by the historical discount factors is to give more weight to chronologically recent Internet search records. For example, the popularity rank of Entity A may be calculated by summing a first sub-time period search score for Entity A multiplied by a first sub-time period historical discount factor; plus the a second sub-time period search score for Entity A multiplied by a second sub-time period historical discount factor; plus the a third sub-time period search score for Entity A multiplied by a third sub-time period historical discount factor; plus the a fourth sub-time period search score for Entity A multiplied by a fourth sub-time period historical discount factor; plus the a fifth sub-time period search score for Entity A multiplied by a fifth sub-time period historical discount factor; plus the a sixth sub-time period search score for Entity A multiplied by a sixth sub-time period historical discount factor; plus the a seventh sub-time period search score for Entity A multiplied by a seventh sub-time period historical discount factor. In one embodiment, each sub-time period is one day in duration. In one embodiment, the first discount factor is a number between 0.4 and 0.9; the second historical discount factor is a number between 0.25 and 0.05;

the third historical discount factor is between 0.15 and 0.01; the fourth historical discount factor is between 0.10 and 0.01; the fifth historical discount factor is a number between 0.05 and 0.01; the sixth historical discount factor is a number between 0.03 and 0.01; and seventh historical discount factor is a number between 0.02 and 0.01.

At step 470, a movement score for each of the one or more entities is assigned based on a change in the popularity rank for each of the plurality of entities over time. At step 480, the popularity rank associated with each of the one or more entities is stored in a data store.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer-storage media having computer-executable instructions embodied thereon for performing a method of automatically determining search popularities for one or more entities, the method comprising:
    receiving a plurality of Internet search records each including one or more search terms associated therewith;
    receiving information regarding a plurality of entities;
    determining a search score for at least one entity within the plurality of entities, wherein the search score for the at least one entity increases each instance an individual Internet search record contains an entity descriptor associated with the at least one entity, wherein the entity descriptor is one or more terms commonly used to identify the at least one entity, and wherein the individual Internet search record contains the entity descriptor if the entity descriptor is identified within the one or more search terms associated with the individual Internet search record;
    determining a popularity rank for the at least one entity by ranking the at least one entity according to the search score associated with the at least one entity relative to a respective search score for each other entity within the plurality of entities;
    determining a movement score for the at least one entity that is based on a change in popularity rank for the at least one entity over a predefined time period, wherein the movement score is calculated using a first calculation method when a present popularity rank for the at least one entity is above a threshold popularity rank and a second calculation method when the present popularity rank for the at least one entity is below the threshold popularity rank, and wherein the second method results in a lower movement score relative to the first method given the same raw popularity rank change for the at least one entity; and
    storing the movement score associated with the at least one entity in a data store.

2. The one or more computer-storage media of claim 1, wherein each of the plurality of entities is a public figure.

3. The one or more computer-storage media of claim 1, wherein the first calculation method is subtracting the $\log_2$ of a present popularity rank for the at least one entity from the $\log_2$ of a previous popularity rank for the at least one entity and the second calculation method is subtracting the $\log_{10}$ of a present popularity rank for the at least one entity from the $\log_{10}$ of a previous popularity rank for the at least one entity.

4. The one or more computer-storage media of claim 1, wherein the method further comprises:
    causing one or more entities with a movement score above a movement threshold to be displayed in association with a user interface on a display device.

5. The one or more computer-storage media of claim 1, wherein the method further comprises:
    causing a line graph indicating the change in popularity rank of at least one of the plurality of entities over time to be displayed on a display device; and
    causing an explanation object that communicates a cause of one or more popularity peaks to be displayed in association with the one or more popularity peaks on the line graph.

6. The one or more computer-storage media of claim 5, wherein the method further comprises:
    determining the cause of an individual popularity peak for a graphed entity based on search terms other than entity descriptors associated with the graphed entity present in select Internet search records that contain the entity descriptors associated with the graphed entity and that are chronologically contemporaneous with the individual popularity peak.

7. The one or more computer-storage media of claim 5, wherein the method further comprises:
    determining the cause of an individual popularity peak on the line graph by evaluating news articles containing one or more entity descriptors for a graphed entity that are chronologically contemporaneous with the individual popularity peak.

8. A computerized method for automatically determining Internet search popularity of one or more entities, the method comprising:
    receiving a plurality of Internet search records submitted over a first time period, wherein each of the plurality of Internet search record includes at least one or more search terms;
    creating a group of spam-filtered Internet search records that includes the plurality of Internet search records submitted over the first time period minus Internet search records determined to be spam;
    receiving an entity list including a plurality of entities;
    receiving one or more entity descriptors associated with each individual entity within of the plurality of entities, wherein an entity descriptor is one or more terms commonly used to identify a particular individual entity;
    determining a plurality of search scores for at least one entity within the plurality of entities, wherein a search score increases each instance an individual Internet search record contains an entity descriptor associated with the at least one entity, wherein the individual Internet search record contains the entity descriptor if the entity descriptor is identified within the one or more search terms associated with the individual Internet search record;
    determining a popularity rank for the at least one entity by ranking the at least one entity according to the plurality of search scores associated with the at least one entity by giving more weight to search scores based on chronologically recent Internet search records;

assigning a movement score each of the plurality of entities based on a change in popularity ranking for each of the plurality of entities over a predefined time period; and storing the popularity rank associated with each of the plurality of entities in a data store.

9. The computerized method of claim 8, wherein the Internet search records are determined to be spam when an entry in a user agent field associated with the individual Internet search record is less than 20 characters in length.

10. The computerized method of claim 8, wherein the popularity rank is determined by multiplying search scores calculated for each of a plurality of sub-time periods by a plurality of historical discount factors that are sub-time-period specific.

11. The computerized method of claim 10, wherein the plurality of sub-time periods includes seven sub-time periods of equal duration wherein a first sub-time period is the most recent and a seventh sub-time period is the least recent, and wherein a first historical discount factor for the first time period is between 0.4 and 0.9, a second historical discount factor for a second sub-time period is between 0.25 and 0.05, a third historical discount factor for a third sub-time period is between 0.15 and 0.01, a fourth historical discount factor for a fourth sub-time period is between 0.10 and 0.01, a fifth historical discount factor for a fifth sub-time period is between 0.05 and 0.01, a sixth historical discount factor for a sixth sub-time period is between 0.03 and 0.01, and a seventh historical discount factor for the seventh sub-time period is between 0.02 and 0.01.

12. The computerized method of claim 8, wherein the method further comprises:

causing a line graph indicating the change in popularity rank of at least one of the plurality of entities over time to be displayed on a display device; and causing an explanation object that communicates a cause of one or more popularity peaks to be displayed in association with the one or more popularity peaks on the line graph.

13. The computerized method of claim 12, wherein the method further comprises:

determining the cause of an individual popularity peak for a graphed entity based on search terms other than entity descriptors associated with the graphed entity present in select Internet search records that contain the entity descriptors associated with the graphed entity and that are chronologically contemporaneous with the individual popularity peak.

* * * * *